Patented Feb. 7, 1939

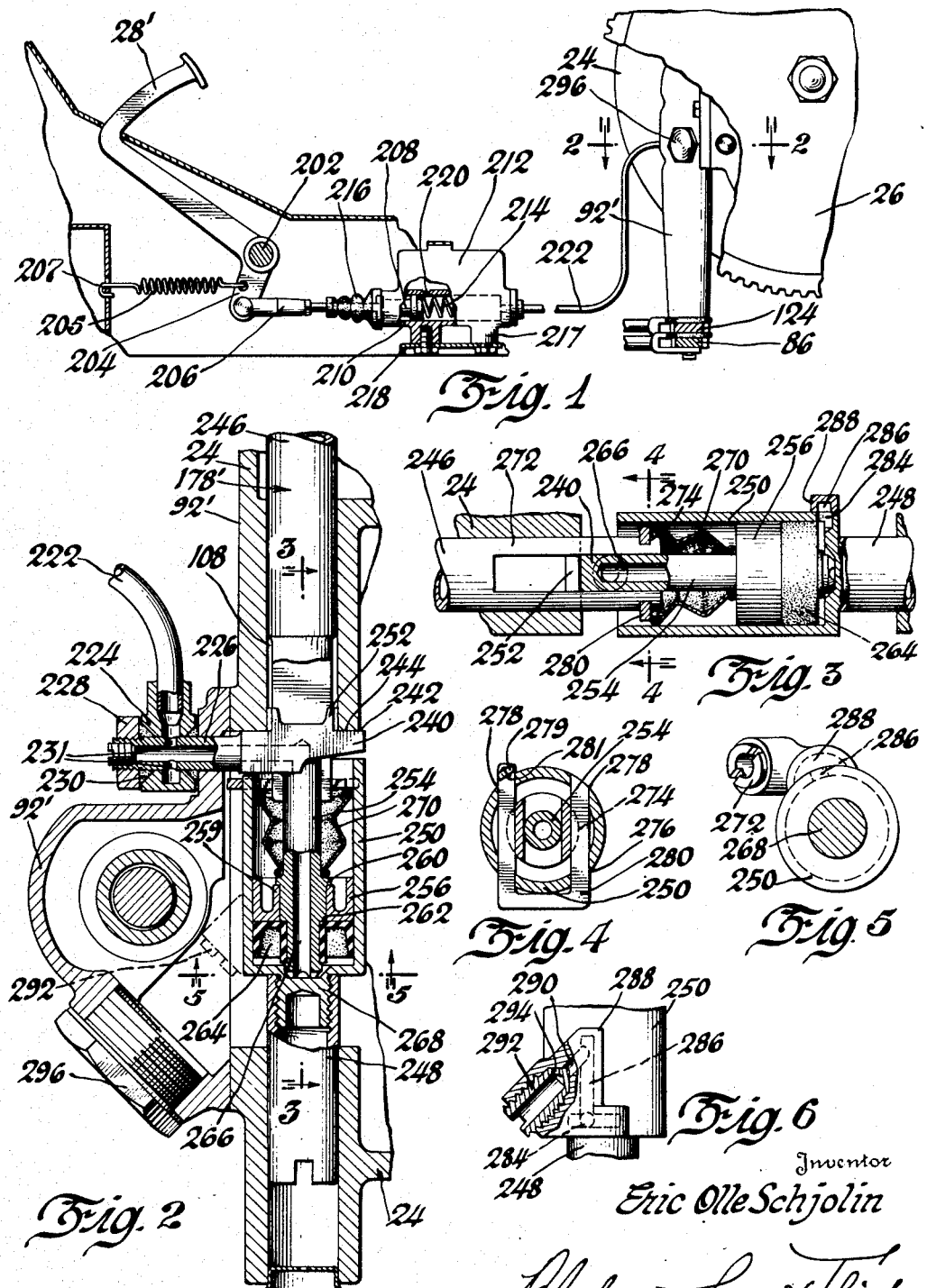

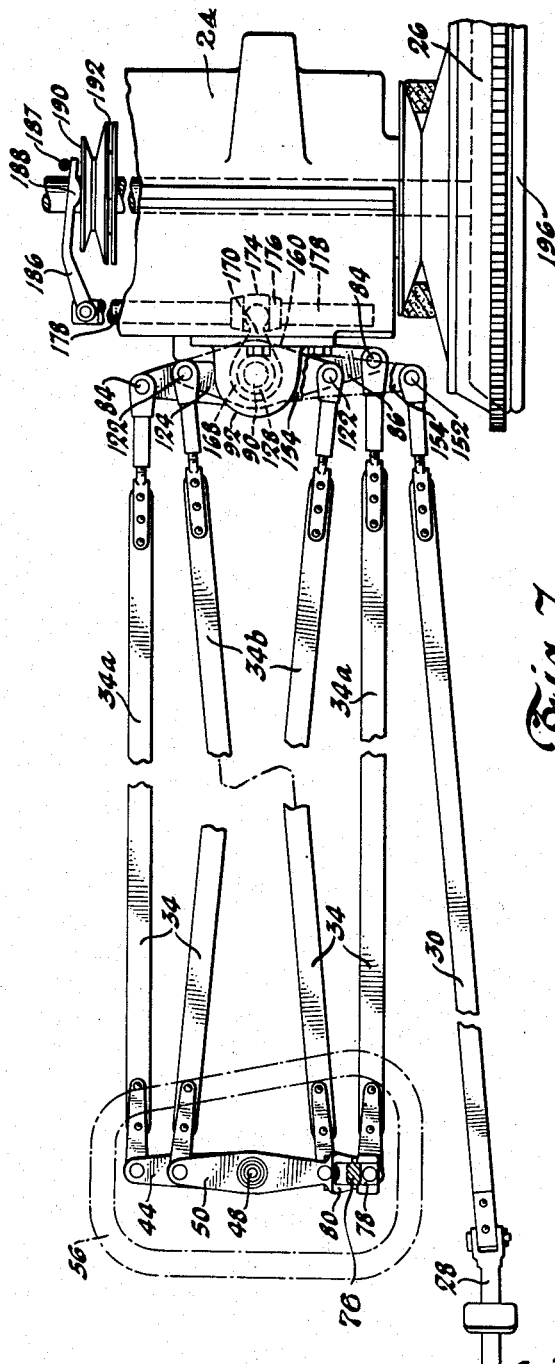

2,146,031

UNITED STATES PATENT OFFICE 2,146,031

HYDRAULIC CLUTCH SHIFTING MECHANISM

Eric Olle Schjolin, Pontiac, Mich., assignor to General Motors Corporation, Detroit, Mich., a corporation of Delaware Original application July 1, 1936, Serial No. 88,318. Divided and this application June 19, 1937, Serial No. 149,947

6 Claims. (Cl. 192—91)

This invention relates to automotive vehicles and has particular reference to means for operating the clutch associated with an internal combustion engine and change transmission all positioned at the rear of the vehicle. This application is a division of my copending application Serial No. 88,318, filed July 1, 1936.

In the present practice where the engine is positioned at the front of the vehicle, the matter of operating the controls such as the shifting of the gears of transmission or of disengaging the clutch has offered no serious problem. However, where the engine, the clutch and the transmission are positioned at the rear of the vehicle, or specifically, over the rear axle, and the controls or operating levers are at the front seat where they are accessible to the driver, the problems are more difficult. Where the transmission is at the rear of the vehicle, it has been found that it is desirable to make a more compact construction, particularly in the case of light vehicles where the engine block and transmission housing are cast as a unit. In the present invention, the transmission is positioned in a direction transversely of the vehicle instead of longitudinally as in prior practice, and this transverse positioning offered additional problems.

The transmission associated with the invention is of the usual gear type having one shiftable gear to operate the transmission in low and reverse, and a second shiftable gear to cause the transmission to operate in second and high. The two shiftable gears are operated by the usual forks which are operated from concentric tubes positioned in a housing or box fastened to the side of the transmission housing. The operating tubes project downwardly out of the box and have attached at their ends arms which in turn are connected by metal ribbons to the shifter means for the transmission as described in my original application. The ribbons are passed from the rear to the front through grooves in the floor board, the grooves being covered by metal strips to maintain a level and rigid floor.

The clutch is operated hydraulically, that is, the usual clutch pedal is connected to a hydraulic cylinder which transmits fluid pressure to the rear of the vehicle to operate the shifter rod for the clutch.

On the drawings

Figure 1 is a view showing the manner of hydraulically operating the clutch shifter rod.

Figure 2 is a sectional view on the line 2—2 of Figure 1.

Figures 3 and 5 are sectional views on the corresponding lines of Figure 2.

Figure 4 is a sectional view on the line 4—4 of Figure 3.

Figure 6 is a detailed view partly in section showing the bleed opening for the hydraulic cylinder.

Figure 7 is a plan view of the clutch mechanism but showing a mechanical way of operating the clutch shifter rod.

Instead of the mechanical operation of the clutch by means of a ribbon, levers and a tube, the clutch shifter rod 178' may be operated hydraulically. The manner in which this is accomplished is shown in Figures 1-5 inclusive. The clutch pedal is indicated at 28' pivoted on a shaft 202 suitably mounted on the vehicle. The pedal 28' has an arm 204 having attached thereto a spring 205 secured at its end 207 to a suitable part of the vehicle and constantly urging the pedal to the position shown in Figure 1. The arm 204 has pivoted thereto a link 206 having a piston 208 attached to its end, the piston operating in a cylinder 210 formed in the bottom of a liquid receptacle 212. A spring 214 between the piston and the end of the cylinder constantly urges the piston to the position shown in Figure 1. A suitable flexible boot 216 is secured in liquid tight relation to the link 206 and to the end of the cylinder 210 to prevent the entrance of moisture and dirt. The receptacle 212 has the feet 217 by means of which it is mounted on a plate 218 secured to any suitable part of the vehicle. The cylinder has the small bleed opening 220 to allow a small amount of fluid to flow into the cylinder from the receptacle 212 when the parts are in the position shown in Figure 1. This will allow the replacement of any fluid which may be lost through leakage.

A tube 222 leads from the end of the cylinder 210 to a fitting 224 secured to the box 92' which in turn is mounted on the transmission housing in the same manner as the box 92 in the parent application. A part of the transmission shifting mechanism is shown at 86 and 124. The fitting is hollow and has the tube 226 passing therethrough. The tube is threaded at its extremity and has threaded thereon the nut 228, the purpose of which is to hold the tube 226 and the fitting 224 rigidly in place. The fitting 224 is soldered to the tube 226 as indicated at 230. The fitting 224 is hollow and communicates with the tube 226 by means of the openings 231.

The tube 226 has a head 240 formed at its extremity, the head 240 projection into the transmission housing 24 and has a flat face 242 which abuts against a corresponding flat face 244 formed in the transmission housing around the passage 108 which receives one end member 246 of a clutch shifter rod 178'. The shifter rod 178' comprises the end member 246, the second end member 248 and the cylinder 250. The head 242 is additionally provided with an extension 252 which fits inside the bearing passage 108.

The head 240 has a tubular extension 254 projecting from one side and secured adjacent the end of this extension is a piston 256. The piston 256 has an inner flange 259 resting on a shoulder 260 on extension 254. A second shoulder 262 on the extension aids in supporting a rubber cup 264 which closely fits the interior of the cylinder 250. The extension 254 is bored as shown at 266 and communicates with the bore of the tube 226 so that the liquid coming through the pipe 222 will be transmitted through the tube 226 and the bore 266 to the end of the cylinder 250. Inasmuch as the piston 256 is stationary, the forcing of liquid into the system will cause the cylinder 250 and its connected end parts 246 and 248 to move downward when considering Figure 2. This will cause the movement of the clutch shifter rail 178' to disengage the clutch 26.

The cylinder 250 has a threaded stub extension 268 which is screw threaded into the member 248 of the shifter rail 178'.

Inside the cylinder 250 a boot 270 is provided. The boot is secured at one end against the piston 256 and its other extremity is pressed tightly against the other end of the cylinder and thereby prevents the entrance of dirt and moisture into the cylinder.

Referring to Figures 3 and 4, there is here shown the manner in which the cylinder 250 is connected to the element 246 of the shifter rail 178'. The shifter rail has its end forked as shown at 272, there being received between the fork, the head 240 of the tube 226. At the extremities of the fork 272 notches 274 are provided and the cylinder 250 is provided with openings 276 and 278 which mate or conform with the notches 274. A U-shaped iron 280 is passed through the openings 276 and 278 and is received therebetween in the recesses 274 and rigidly connects the cylinder 250 with the element 246. A wire 279 passing through an opening 281 in the end of the U iron 280 holds the iron in place.

In Figures 5 and 6 there is shown the manner in which the air is emptied from the system in order properly to cause the hydraulic mechanism to operate. The cylinder 250 has a passage 284 formed thereon which connects with a passage 286 formed in a projection 288 secured to the cylinder. The passage 286 in turn connects with the passage 290 which is shown in Figure 6 as closed by a plug 292 screw threaded in the end of the passage. When a system is originally installed the plug 292 is unscrewed so that the passage 290 is in communication with the opening 294 therein, the passage 294 communicating with the atmosphere through the hollow plug 292. The operator reciprocates with the clutch pedal 28' a number of times until all of the air is expelled and there commences to come from the plug the liquid of the hydraulic system. When the liquid flows in a sufficient quantity to indicate that all of the air is expelled from the system, the plug 292 is tightly screwed in place to cause the opening 294 tightly to seat against its seat as shown in Figure 6 and prevent a further escape of liquid. The system is now filled with liquid and ready to operate.

The housing 92 is provided with a screw threaded plug 296 to allow access to the plug 292.

The hydraulic operation of the clutch has the advantage of being unaffected by relative movement between the engine and body. A short length flexible tubing may be placed in the pipe line 222 at the fixture 224 and this tubing will take care of all relative movement.

In Figure 7 there is shown some of the structure of the basic application Ser. No. 88,318. This structure is to illustrate the connection of the clutch with the clutch operator rod 178' of Figure 2.

Referring to Figure 7, it will be noted that the transmission in the housing 24 is operated by ribbons 34 which comprise an outer pair 34a and an inner pair 34b. The pair 34a are connected at their front to the ends of a lever 44 pivoted at its center in the ball bearing on a shaft 48. The pair of ribbons 34b are connected at the front end to the ends of a shorter lever 50 pivoted at its center in a ball bearing likewise mounted on the shaft 48. In the neutral position of the transmission, the levers 44 and 50 are positioned over each other as shown in Figure 7.

The shaft 48 is mounted in a base plate 56 secured to the floor of the vehicle in any suitable way. The base 56 has mounted therein the gear shift lever of which the lower end 76 only is indicated. The end 76 is rounded and is adapted to be shifted to be received in either the yoke 78 on the lever 44 or the yoke 80 on the lever 50. In the position of the lever end 76 as shown in Figure 7, it is incapable of moving either of the levers 44 or 50 because it is in engagement with the fingers of the usual H slot in which the shift lever operates. By shifting the lever in the plane of the paper, either to the right or to the left, the end 76 may be caused to be engaged in either of the yokes 78 or 80 and also remove the shank of the lever into the open side of the H slot so that the lever may now be moved to swing either the lever 44 or the lever 50 depending on whether the end 76 has been shifted into the right or left slot. The swinging of the lever 44 for example, will cause the movement of the ribbons 34a to shift the gears of the transmission 24.

The rear ends of the ribbons 34a are connected at 84 to the extremity of an arm 86 which in turn is secured at its middle to a tube or rod 90 which extends vertically upward in a housing or box 92 secured by means of the bolts to the sides of the transmission casing 24.

The ribbons 34b are connected at the rear ends as at 122 to a lever 124 which is positioned over the lever 86 but is considerably shorter. The lever 124 is secured at its center to a tube 128 which is concentric with and fits around the tube or rod 90 and extends coincident therewith in the housing 92 to substantially the end of the tube 90.

The ribbon 30 to operate the clutch 26 from the pedal 28 is attached at its rear end as at 152 to a lever 154. The lever 154 is secured at its end to a third tube 160 which has its lower end mounted in a bearing positioned in the lower extremity of the box 92 and its upper end mounted in a second bearing mounted in a partition in the box 92. The upper extremity of the tube 160 has secured thereto a hub 168 of a lever 170, the end 172 of which is received in a notch 174 formed in a hub 176 secured to the clutch shifter rail 178.

The clutch shifter rail 178 is shown as extending a considerable distance in the transmission housing and at its end has pivotally secured thereto the clutch shifter fork 186. This fork is fulcrumed on a pin 187 and has the tooth 188 which presses against the plate 190 to compress a plurality of Belleville washers 192. When the clutch pedal is depressed the lever end attached to the shifter rod 178 will pull the lever downwardly when considering Figure 7 to compress the Belleville washers and move a quill shaft to shift the shiftable member 196 of the clutch 26. The clutch and its operation is better shown and described in my U. S. Patent No. 2,096,979.

I claim:

1. In a hydraulic means for shifting a shifter rail to operate a clutch, means to journal the rail in a transmission housing of an automotive vehicle, a cylinder formed in said rail, a stationary piston in said cylinder, a passage in the piston to enable liquid to pass from one side of the piston to the other, means to force liquid from one side of the piston to the other to cause the movement of the cylinder and the consequent shifting of the rail to operate the clutch.

2. In a hydraulic means for shifting the shifter rail to operate the clutch associated with the engine and transmission of an automotive vehicle, said engine and clutch being positioned at the rear of the vehicle, a lever at the front of the vehicle operating a means to transmit liquid pressure, a pipe to carry the liquid to the rear of the vehicle, a slidable rail mounted in the transmission housing, a cylinder formed in said rail, a stationary piston in said cylinder, a passage in said piston to enable the liquid from the pipe to be passed from one side of the piston to the other, the forcing of the liquid from one side of the piston to the other causing the movement of the cylinder and rail to cause the shifting of the clutch.

3. In a hydraulic means for operating a clutch, a shifter rail comprising two end pieces and an intermediate cylinder rigidly interconnected, means to mount the shifter rail slidably, a stationary piston in the cylinder, and means in the piston to enable liquid to be transmitted from one side thereof to the other to cause the cylinder to be moved over the piston.

4. In a hydraulic means for shifting the clutch of an automotive vehicle having an engine and a transmission housing at the rear of the vehicle, a clutch shifter rail slidably mounted in the transmission housing, a hollow intermediate part in said shifter rail, a piston in said hollow part, means to transmit fluid into the hollow part through the piston to cause pressure to be exerted on one side of the piston to move the hollow part, and means at the front of the vehicle operable from the driver's seat to cause the fluid to move into the hollow part to operate the clutch shifter rail.

5. In a hydraulic means for shifting the clutch of an automotive vehicle having an engine and a tranmission housing at the rear of the vehicle, a clutch shifter rail slidably mounted in the transmission housing, a head secured in the housing and over which the rail is slidable, a piston rigidly secured to said head, said piston and head being stationary, a cylinder surrounding the piston and forming a part of the rail, a passage in the head and piston to enable fluid to pass into the cylinder and force the cylinder and rail to move relative to the piston to cause the movement of the rail and the operation of the clutch, and means at the front of the vehicle to transmit the hydraulic pressure to the head at the rear of the vehicle.

6. In a hydraulic means for shifting the clutch of an automotive vehicle having an engine positioned at the rear thereof, a clutch shifter rail slidably mounted at the rear of the vehicle, a cylinder embodied in said rail, a head rigidly mounted at the rear of the vehicle and over which the shifter rail is adapted to slide, an extension on the head, a piston on the extension, said cylinder surrounding said piston, means at the front of the vehicle operable to transmit hydraulic pressure to the rear of the vehicle, and a passage connected to said means and extending through the head, the extension, and the piston and adapted to deliver fluid between the piston and the cylinder to cause the movement of the cylinder to move the shifter rail to shift the clutch.

ERIC OLLE SCHJOLIN.